Patented Dec. 4, 1951

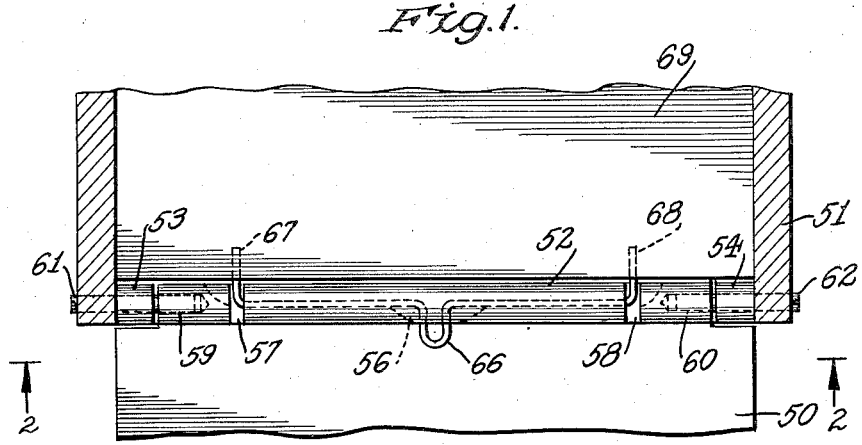
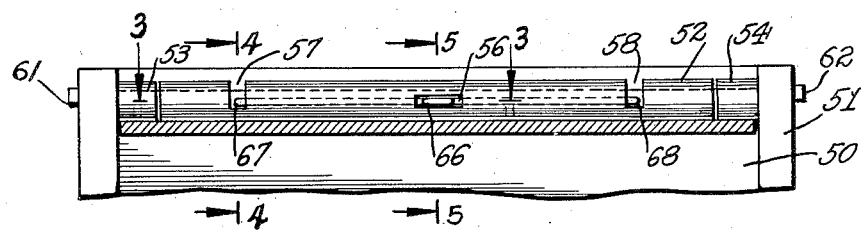
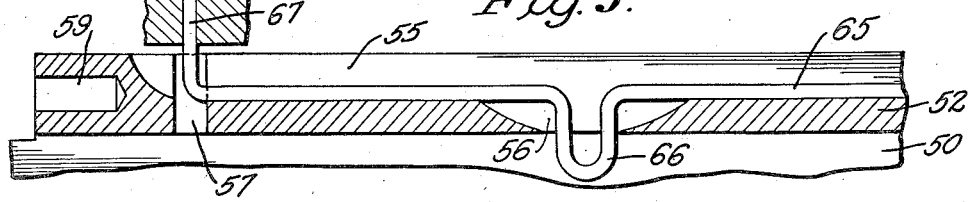
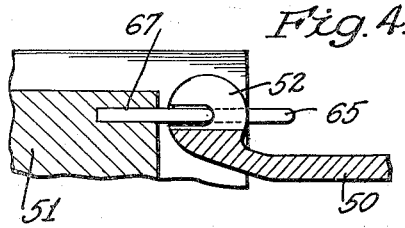
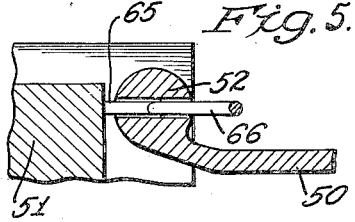

2,576,996

UNITED STATES PATENT OFFICE 2,576,996

HINGE FOR PHOTOGRAPHIC APPARATUS

William Castedello, Stamford, Conn., assignor to
The Kalart Company Inc., Stamford, Conn.

Application February 27, 1946, Serial No. 650,435

5 Claims. (Cl. 16—180)

1

This invention relates to photographic apparatus and devices, more particularly to hinges as used in connection with photographic apparatus, such as cameras.

The word "camera," as used herein, is intended to include apparatus for the taking of photographs as well as devices, such as moving picture projectors, television cameras, enlargers, and the like, or in other words, any device comprising a lens to be focused on an object or screen.

One object of the invention is a novel and improved hinge for photographic apparatus and devices which is simple and rugged in construction, reliable in operation, inexpensive in manufacture and substantially invisible from the outside.

Another object of the invention is a novel and improved hinge particularly adapted for hinging a camera bed to a camera casing, the hinge according to the invention having the important advantage of cushioning movement of the camera bed toward opening and closing, thereby protecting delicate parts of the camera against shock when the camera bed is opened or closed.

Other and further objects, features and advantages of the invention will be set forth hereinafter, and the novel features thereof defined by the appended claims.

In the accompanying drawings several now preferred embodiments of the invention are shown by way of illustration and not by way of limitation.

Fig. 1 is a plan view of a hinge according to the invention in application to the bed of a camera, the walls of the camera casing being shown in section.

Fig. 2 is a sectional front view of Fig. 1 along line 2—2 of Fig. 1.

Fig. 3 is a fractional sectional view along line 3—3 of Fig. 2 on an enlarged scale.

Fig. 4 is a sectional view along line 4—4 of Fig. 2.

Fig. 5 is a sectional view along line 5—5 of Fig. 2, and

Fig. 6 shows the spring member of the hinge according to Fig. 1.

Referring now to the drawings in detail, Figs. 1 to 6 inclusive show an invisible hinge according to the invention, the hinge being employed to hinge a camera bed 50 to a camera casing 51. The camera casing is shown as being cut near the bottom thereof. All parts of the camera conventionally mounted within the camera casing and supported on the camera bed are omitted,

2 these parts being not essential for the understanding of the invention. Camera bed 50, as shown in Figs. 1 and 2 is provided at its side hinged to the camera casing with a substantially cylindrical re-inforcement 52, either integral with the body of the camera bed or rigidly fastened thereto. Re-inforcement 52 is recessed and fitted between two noses 53 and 54 respectively, extending from the side walls of casing 51, as can best be seen on Fig. 1. The re-inforcement serves as housing for the hinge according to the invention. For this purpose, an elongated recess 55 is provided in re-inforcement 52. This recess is deepened at its center or near its center to form an opening 56. Re-inforcement 52 is further provided with two peripheral recesses 57 and 58 respectively. These peripheral recesses extend through an angle corresponding to the desired opening movement of camera bed 50, usually through about 90°. There is provided at each end of re-inforcement 52 hole 59 and 60 respectively which serve to receive pivot pins 61 and 62 respectively pivotally supported in the side walls of casing 51. As will be apparent, the previously described arrangement permits a swinging movement of camera bed 50 relative to casing 51.

In order to attain the desired resilient movement of camera bed 50, both for opening and closing thereof, a spring member 65 is inserted in recess 55. As can best be seen from Fig. 6, this spring member is made of a suitable springy material such as steel and provided with a central projection 66 which may be U-shaped. Furthermore, both end portions 67 and 68 of spring member 65 are bent off transversely to the axis of the spring member. End portions 67 and 68 engage peripheral recesses 57 and 58 respectively and extend into a corresponding hole of bottom 69 of the camera casing (see Fig. 3).

As is will be apparent from the drawings and the previous specification, a swinging movement of the camera bed will cause a biasing of the spring member about its longitudinal axis, a bending of the spring member at end portions 67 and 68 being avoided by peripheral slots or recesses 57 and 58. As will further be apparent, the biasing of the spring member will urge the camera bed into a position corresponding to the unbiased condition of the spring member.

The fixed points of the spring member and the shape of the recesses in the re-inforcement may be selected so that the spring member is unbiased either in the closed position of the camera bed or in the open position thereof. In such event, the camera bed will be urged by the spring action either into an open position or into a closed position, as the case may be. However, the inventors have found it preferable to arrange the fixed points of the spring member in such a manner that the spring member is unbiased when the camera bed is placed in an intermediate position. As a result, either a complete opening or a complete closing of the camera bed will cause a certain biasing of the spring member. This has the advantage that the movement of the camera bed into an open position or into a closed position will be cushioned, thereby avoiding an abrupt stopping of the camera bed in either direction, thus protecting delicate parts of the camera.

In the previous description, the invention has been described in connection with a camera bed. However, it should be understood that the usefulness of the invention is not limited to such applications and that the invention can be advantageously applied to other hinged parts of a camera and also to other photographic apparatus or devices in general where similar conditions are present.

While the invention has been described in detail with respect to a certain preferred example and embodiment it will be understood by those skilled in the art after understanding the invention, various changes and modifications may be made without departing from the spirit and scope of the invention and it is intended therefore in the appended claims, to cover all such changes and modifications.

What is claimed as new and desired to be secured by Letters Patent is:

1. A cushioned hinge for photographic apparatus including a stationary portion and a pivotal portion hinged thereto for a limited pivotal movement of the latter, comprising pivot means on one of said portions and pivotally engaging the other portion for pivotally connecting the said portions, an elongated spring member capable of being distorted substantially along its longitudinal axis, means supporting the spring member on one of said portions in a position substantially parallel to the pivot axis of the pivotal portion, first fastening means fastening each end of the spring member to one of said portions, and second fastening means fastening an intermediate section of the spring member to the other portion, said first and second fastening means securing the ends and the intermediate section of the spring member to the respective portion so as to prevent an axial rotation of the spring member, thereby causing a torsional distortion of the spring member by a movement of the pivotal portion, said spring member being held by the fastening means in a position of minimal torsional distortion in an intermediate position of the pivotal portion and in a position of increased torsional distortion in either limit position of the pivotal portion, thereby cushioning movements of the pivotal portion in either direction from the said intermediate position.

2. A cushioned hinge for photographic apparatus including a stationary portion and a pivotal portion hinged thereto for a limited pivoted movement of the latter portion, comprising a pair of pivot members provided on opposite sides of the pivotal portion and pivotally connecting the latter to the stationary portion, an elongated spring member capable of being distorted substantially along its longitudinal axis, said pivotal portion including an elongated recess positioned substantially parallel to the pivot axis of the pivotal portion and arranged to receive the spring member, a bent-off section on each end of the spring member, each of said sections being inserted in a corresponding recess in the stationary portion, thereby preventing an axial rotation of the spring member relative to said stationary portion, and fastening means fastening an intermediate section of the spring member to the pivotal portion for preventing an axial rotation of the spring member relative to the latter portion, thereby causing a torsional distortion of the spring member by a movement of the pivotal portion, said spring member being secured to said portions in a position of minimal torsional distortion in an intermediate position of the pivotal portion and in a position of increased torsional distortion in either limit position of the pivotal portion, thereby cushioning movements of the pivotal portion in either direction from the said intermediate position.

3. A cushioned hinge for photographic apparatus including a stationary portion and a pivotal portion hinged thereto for limited pivotal movement, comprising an elongated spring member capable of being distorted substantially along its longitudinal axis, a substantially cylindrical element provided at the pivotal portion and positioned substantially parallel to the pivot axis of the pivotal portion, a hinge member at each end of the cylindrical element and pivotally engaging the stationary portion for pivotally connecting the said two portions, said cylindrical element having an elongated longitudinal recess for receiving the spring member, a bent-off section at each end of the spring member, each of said sections being inserted in a corresponding recess in the stationary portion for securing the spring member against axial rotation relative to the stationary portion, a projecting element at an intermediate section of the spring member, said cylindrical element having a second recess arranged to receive said projection for preventing an axial rotation of the spring member relative to the pivotal portion, thereby causing a torsional distortion of the spring member by a movement of the pivotal portion, said spring member being secured to said portion in a position of minimal distortion in an intermediate position of the pivotal portion and in a position of increased torsional distortion in either limit position of the pivotal portion, thereby cushioning movements of the pivotal portion in either direction from the said intermediate position.

4. A cushioned hinge for photographic apparatus including a stationary portion and a pivotal portion hinged thereto for limited pivotal movements, comprising an elongated spring member capable of being distorted substantially along its longitudinal axis, a substantially cylindrical element provided at the pivotal portion and positioned substantially parallel to the pivot axis of the pivotal portion, a hinge member at each end of the cylindrical element and pivotally engaging the stationary portion for pivotally connecting the said two portions, said cylindrical element having an elongated longitudinal recess for receiving the spring member, a bent-off section at each end of the spring member, each of said sections being inserted in a corresponding recess in the stationary portion, for preventing axial rotation of the spring member relative to the stationary portion, an intermediate section of the spring member including a projecting loop, said cylindrical element having a second recess arranged to receive said projecting loop for preventing axial rotation of the spring member relative to the pivotal portion, thereby causing a torsional distortion of the spring member by a movement of the pivotal portion, said cylindrical element further including two circumferential recesses, each positioned to receive one of the bent-off spring member sections, thereby permitting a swinging movement of the pivotal portion without bending said sections, said spring member being secured to said portions in a position of minimal torsional distortion in an intermediate position of the pivotal portion and in a position of increased torsional distortion in either limit position of the pivotal portion, thereby cushioning movements of the pivotal portion in either direction from the said intermediate position.

5. A hinge as described in claim 3, wherein said spring member is constituted by a flexible wire bent off at each end and also bent off at an intermediate section to form the said projection.

WILLIAM CASTEDELLO.

REFERENCES CITED

The following references are of record in the file of this patent:

UNITED STATES PATENTS

| Number | Name | Date |
|---|---|---|
| 214,213 | Warner | Apr. 8, 1879 |
| 251,591 | Jaeger | Dec. 27, 1881 |
| 753,381 | Von Eigen | Mar. 1, 1904 |
| 822,555 | Rogers | June 5, 1906 |
| 1,292,725 | Dexter | Jan. 28, 1919 |

FOREIGN PATENTS

| Number | Country | Date |
|---|---|---|
| 4,818 | Great Britain | Mar. 7, 1894 |